Feb. 7, 1950  E. T. ROBERTS  2,497,016
AUTOMATIC TRAILER BRAKE
Filed July 28, 1947  2 Sheets-Sheet 1
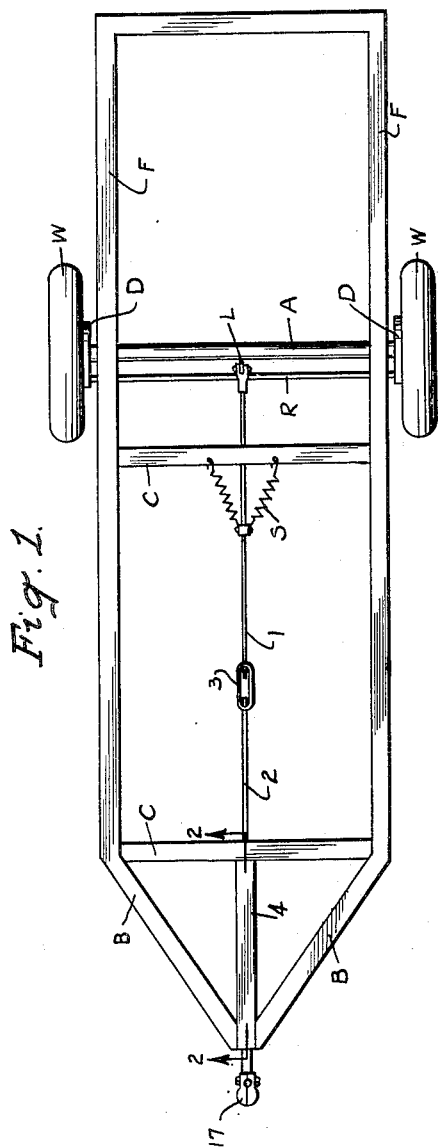
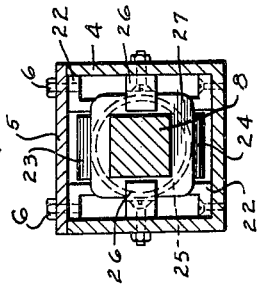
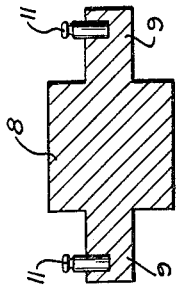
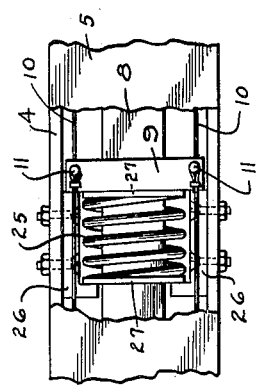
INVENTOR.
Eli T. Roberts
BY *Victor J. Evans & Co.*
ATTORNEYS Feb. 7, 1950
E. T. ROBERTS
2,497,016
AUTOMATIC TRAILER BRAKE
Filed July 28, 1947
2 Sheets-Sheet 2
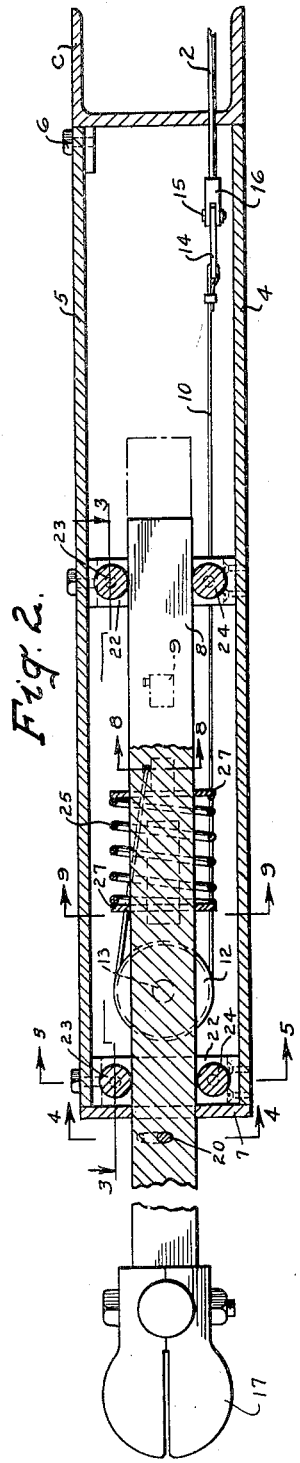
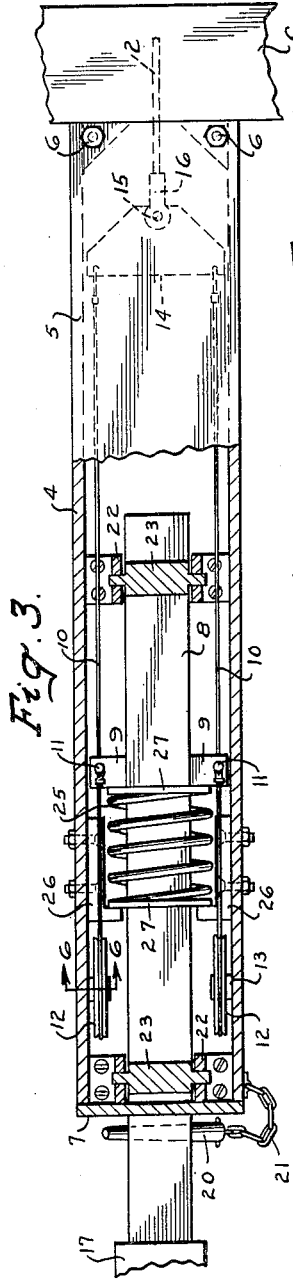
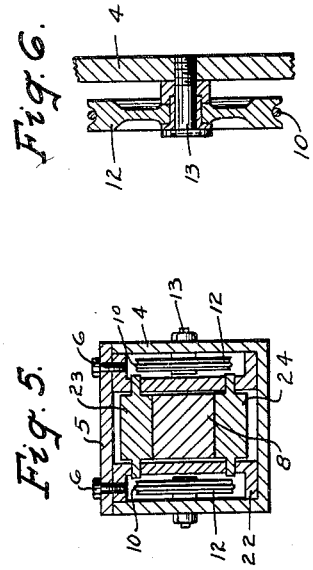
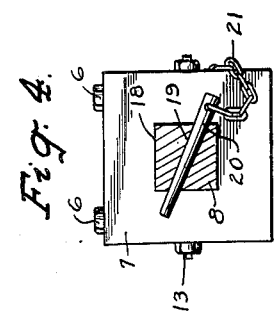
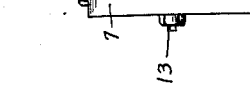
INVENTOR.
ELI T. ROBERTS
BY Victor J. Evans & Co.
ATTORNEYS Patented Feb. 7, 1950

2,497,016

UNITED STATES PATENT OFFICE 2,497,016

AUTOMATIC TRAILER BRAKE

Eli T. Roberts, Carpenterville, Oreg.

Application July 28, 1947, Serial No. 764,035

2 Claims. (Cl. 188—112)

The present invention relates to the general class of vehicle brakes, and more specifically to an automatic trailer brake of the vehicle operated type which is actuated by movement of the trailer in combination with draft rigging or draft gear of the vehicle. While my invention is capable of use in a single vehicle of the wheeled type, as well as adapted for use in a train of vehicles, for convenience of illustration and description I have embodied the invention in a two-wheel trailer that is adapted to be towed or hauled by a tractor, truck, car, or other automotive vehicles, and the draft gear is automatically operated to apply the usual or standard friction brakes within the drums on the wheels of the vehicle.

The brake operating mechanism of the draft gear is adapted to apply the brakes under forward-set, or forward movement of the trailer with relation to the towing-vehicle when the speed of the latter is decreased, and the forward movement of the trailer is arrested when the towing-vehicle is stopped, thereby automatically maintaining the proper relation at all times between the two vehicles.

The primary object of the invention is the provision of equipment for the trailer including the draft rigging and brake operating mechanism which is composed of a minimum number of parts that may, with facility and low cost of production be manufactured, and assembled with convenience to assure a reliable, efficient, and durable appliance for the performance of its required functions. To this end the invention consists in certain novel features of construction and combinations and arrangements of parts as will hereinafter be described and more particularly set forth in the appended claims.

In the accompanying drawings I have illustrated a complete example of a physical embodiment of my invention wherein the parts are combined and arranged in accord with one mode I have devised for the practical application of the principles of my invention. It will, however, be understood that changes and alterations are contemplated and may be made in these exemplifying drawings, within the scope of my claims, without departing from the principles of the invention.

Figure 1 is a diagrammatic plan view of a two wheel trailer equipped with the draft gear and brake operating mechanism of my invention.

Figure 2 is an enlarged detail vertical and longitudinally extending sectional view at line 2—2 of Fig. 1 showing the structure of my invention.

Figure 3 is a partial plan view and partial horizontal sectional view as at line 3—3 of Fig. 2.

Figure 4 is a vertical transverse sectional view at line 4—4 of Fig. 2 showing the draw bar and its back-up pin.

Figure 5 is a vertical transverse sectional view at line 5—5 of Fig. 2; and

Figure 6 is a sectional detail view at line 6—6 of Fig. 3;

Figure 7 is a detail fragmentary plan view showing the resilient mount for the draw bar;

Figure 8 is a detail cross section of the draw bar; and Figure 9 is a transverse detail sectional view at line 9—9 of Fig. 2.

In order that the general arrangement and utility of parts may readily be understood I have disclosed in Fig. 1 portions of a two wheel trailer having a rectangular frame F with cross bars C, and converging front braces B; the axle A is equipped with wheels W having usual brake drums D in which the brakes are enclosed and operated by the rock shaft R and brake lever L that is adapted to rock the shaft and apply the brakes, and suitable spring devices S may be employed for retracting the brakes.

At the longitudinal center of the trailer frame an adjustable brake operating bar is located, which includes a rear section 1 that is pivoted to the brake lever L, and a front section 2 united with the rear section by a turn buckle 3, and the front end of the operating bar or rod-section 2 enters a box frame or housing 4 through an opening in its rear end.

The box frame, which is rectangular in cross section forms a housing for the draft rigging or draft gear of the trailer, and it is provided with a top cover plate 5 that is bolted in place as at 6, and a front or head plate 7, also bolted in place. The housing as here shown is rigidly mounted by bolts 6 with its rear end fixed to the front cross bar C, and its front end rigidly attached at the converging ends of the braces B, as by bolts, thereby forming a box member of the trailer frame.

Within the housing is resiliently mounted a reciprocable draft bar 8, preferably square in cross section, which is equipped with a pair of laterally extending bumper lugs 9, 9 that form anchors for a pair of duplicate operating cables 10, 10 fastened to bolts 11, 11 of the lugs. As seen in Figs. 2 and 3 these cables extend forwardly from the anchoring lugs, then over and around sheaves 12, 12 that are journaled within the housing on bearing pins 13 mounted in the opposed lateral walls of the housing, and the lower, pulling flights of the cables 10, 10 are connected to an equalizing cross-head 14 that is pivoted at 15 to a head 16 of the brake operating rod-section 2.

By this novel construction and arrangement of parts, if and when the trailer with its rigid frame and housing moves forward, (to the left in Fig. 2) with relation to the draw bar 8, the two sheaves or pulleys 12, 12, moving with the housing, will pull the lower flights of the cables thereby imparting a pull to the brake operating rod 1—2—3 which in turn rock lever L and shaft R to apply the brakes within the drums D, and the springs S are designed to retract the brakes.

The front end of the draw bar is equipped with a suitable coupling member, as the spherical ball 17, for connection with complementary members mounted on the rear of the towing-vehicle, and the draw bar is reciprocable through an open bore 18 in the front head 7 of the housing 4.

For initial and temporary use in coupling the trailer to the towing-vehicle, the draw bar is slotted as at 19, preferably on an oblique plane, to receive a back-up pin 20 that is loosely coupled to the draw bar and the housing by chain 21. The pin is removed after the coupling has been properly made, to permit relative and resilient movement between the housing and the draw bar; and to insure automatic removal of the pin in the absence of manual removal of the pin, the sloping slot and tapered pin permit the latter to work loose and to drop free of the draw bar.

For guiding the movement of the housing with relation to the draw bar, or vice versa, the housing is equipped with two pairs of channel guide-brackets 22, 22, bolted within the housing against its top and bottom walls, and two sets of bearing rollers, as 23 and 24, are journaled in these guide brackets for rolling contact and support of the draw bar as it reciprocates longitudinally within the housing.

The draw bar is resiliently mounted by the use of a spring 25 surrounding the bar and interposed between the lugs 9, 9 of the bar and front angle brackets 26, 26, bolted to the housing, and end plates 27, 27, are employed for taking up the thrust movements.

The spring provides a buffer for absorbing the strains and motion imparted to the draft gear in pulling and buffing when the trailer is being towed by a coupled vehicle, and as before explained the operating cables are actuated to operate the breaks during relative movements of the draft rigging and housing.

Having thus fully described my invention, what I claim as new and desire to secure by Letters Patent is:

1. In automatic means for operating the brake mechanism of a wheeled vehicle, the combination with a housing having a pair of sheaves journaled therein, a pair of pull cables guided on the sheaves and connected with the braking mechanism, and two sets of spaced bearing rollers journaled in the housing, of a draw-bar mounted within said sets of rollers, anchoring lugs rigid with the draw-bar to which said cables are attached, spaced brackets mounted within the housing, and a buffing spring coiled about the draw bar and interposed between said lugs and brackets.

2. The invention as in claim 1 wherein said draw-bar is provided with a transverse slot exterior of the housing and a gravity released back-up pin is mounted in the slot.

ELI T. ROBERTS.

REFERENCES CITED

The following references are of record in the file of this patent:

UNITED STATES PATENTS

| Number | Name | Date |
| --- | --- | --- |
| 1,960,742 | Hamilton | May 9, 1934 |
| 2,149,624 | Owen | Mar. 7, 1939 |